2,906,614

4-HALO-2-BUTYNYL N-(3-HALOPHENYL) CARBAMATES AND USE FOR CONTROLLING OATS

Thomas R. Hopkins, Johnson County, and Joe W. Pullen, Pittsburg, Kans., assignors to Spencer Chemical Company, Kansas City, Mo., a corporation of Missouri No Drawing. Application March 24, 1958
Serial No. 723,133

18 Claims. (Cl. 71—2.6)

This invention relates to new chemical compounds useful for agricultural purposes. More particularly, this invention is concerned with novel butynyl carbamates which possess plant growth regulating properties.

According to the present invention there are provided novel 4-halo-2-butynyl N-(3-halophenyl)carbamates of the formula

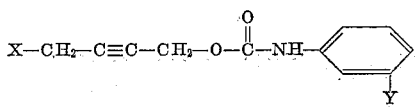

wherein X and Y are the same or different halogens, and particularly chlorine or bromine. These compounds affect the growth of plants and, in particular, significantly retard the growth of oats, and especially wild oats which is a noxious weed in many localities.

The production of these novel compounds may be conveniently effected by reacting a 4-halo-2-butynol-1 with a 3-halophenylisocyanate. This reaction may be represented as follows:

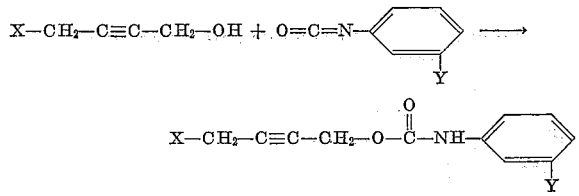

wherein X and Y have the significance previously assigned.

Some butynols which may be used in this reaction are 4-chloro-2-butynol-1 and 4-bromo-2-butynol-1.

Representative of the isocyanate reactants which may be employed are 3-chlorophenylisocyanate and 3-bromophenylisocyanate.

The reaction between the 4-halo-2-butynol-1 and 3-halophenylisocyanate is conveniently effected by bringing the reactants together in the presence of an inert reaction medium. Solvents such as benzene, ether, carbon tetrachloride and chloroform may be used for this purpose. Essentially anhydrous reaction conditions are considered desirable as highest yields are thereby attained. The presence in the reaction mixture of a basic substance such as pyridine is desirable to catalyze the reaction. Room temperature and somewhat higher and lower temperatures thereto are suitable for the reaction. At such temperatures it goes to completion in a short time, three hours ordinarily being adequate. The 4-halo-2-butynyl N-(3-halophenyl) carbamates so produced are relatively insoluble in a number of solvents and, therefore, can be precipitated from solution. They may be recovered easily by filtration.

Some of the compounds which may be produced in this way are 4-chloro-2-butynyl N-(3-chlorophenyl)carbamate, 4-bromo-2-butynyl N-(3-chlorophenyl)carbamate, 4-chloro-2-butynyl N-(3-bromophenyl)carbamate and 4-bromo-2-butynyl N-(3-bromophenyl)carbamate.

These compounds may also be produced by an alternative process which comprises reacting a 4-halo-2-butynyl haloformate with a 3-haloaniline. This process may be represented as follows:

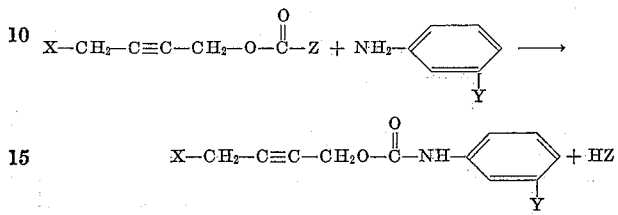

wherein X and Y have the significance previously assigned and Z is a reactive halogen and particularly is chlorine or bromine.

Some reactants which may be used in this process are 4-chloro-2-butynyl chloroformate, 4-bromo-2-butynyl chloroformate, 3-chloroaniline and 3-bromoaniline.

This alternative process is readily effected by employing the conditions used in the first method described above except that a molar excess of the aniline is employed to neutralize the by-product hydrogen halide as it is formed. In order to conserve the more expensive anilines a base such as pyridine may be used instead of excess aniline. The resulting product may be recovered as indicated in regard to the first process.

As previously stated, these compounds have plant growth regulating properties. They are surprisingly very effective in retarding and controlling the growth of oats, and particularly, wild oats. This ability to control the growth of wild oats is very useful because wild oats are a weed prevalent in many waste areas and also in the crop fields, particularly of the Northwest and Pacific Coast regions of the United States and the prairie provinces of Western Canada. These compounds kill or retard the growth of wild oats at application levels which have no, or a negligible, effect on crops such as wheat, barley, flax and peas.

The post emergence herbicidal activity of these compounds was determined by carefully controlled experiments. A water suspension of 4-chloro-2-butynyl N-(3-chlorophenyl)carbamate was used in the tests. It was prepared by grinding together 0.70 gram of 4-chloro-2-butynyl N-(3-chlorophenyl)carbamate and 7 drops of Ultrawet 60L (a product of Atlantic Refining Co. described as an alkyl aryl sulfonate type anionic surface-active agent) in a mortar. A few drops of water and one milliliter of a 5% aqueous methyl cellulose solution were then added. When the mixture was workable, water was added to bring the suspension into an emulsion. Five milliliters of a kerosene emulsion—19% kerosene and 1% Emulphor EL (a polyoxyethylated vegetable oil) in water—was added.

Oats (*Avena sativa*), wheat, peas, radish, flax and alfalfa were planted in greenhouse beds in rows four inches apart. "Bonny Best" tomato plants were grown in pots. When the beds and tomato plants had a suitable growth (3–8 inches) they were sprayed with the above water emulsion at rates of 10, 5, 2.5 and 1.25 pounds of 4-chloro-2-butynyl N-(3-chlorophenyl)carbamate per acre. Two weeks after the application the plants were observed and the results of treatment recorded as in Table I.

TABLE I

| Rate (lbs./acre) | Effects on various crops | | | | | | |
|---|---|---|---|---|---|---|---|
| | Oats | Wheat | Peas | Radish | Flax | Alfalfa | Tomato |
| 10 | 4 | G1 | GN1 | GN1 | GN1 | GN1 | EGN2 |
| 5 | G3 | G1 | N1 | G1 | G1 | G1 | EGN1 |
| 2.5 | G3 | 0 | N1 | 0 | 0 | 0 | 0 |
| 1.25 | G3 | 0 | 0 | 0 | 0 | 0 | 0 |

The peas were toppled at the fourth internode (vascular transition zone).

Key to ratings:
E=Epinasty
G=Inhibition of growth
N=Necrosis
0=No effect
1=Slight
2=Moderate
3=Severe
4=Dead plants To illustrate the effectiveness of 4-chloro-2-butynyl N-(3-chlorophenyl)carbamate in controlling the growth of wild oats (*Avena fatua*) in the presence of other plants, each of four flats of soil were planted to wheat, barley, peas and wild oats. When the plants were up they were sprayed with the water suspension of 4-chloro-2-butynyl N-(3-chlorophenyl)carbamate at rates of 10, 3.16 and 1 pound of active chemical per acre. Five weeks after spraying, the mean height of ten plants was recorded. Table II gives the results.

TABLE II

| Crop | Mean height (cm.) of plants 5 weeks after spraying at rates (lbs./acre) of— | | | |
|---|---|---|---|---|
| | 10 | 3.16 | 1 | 0 (control) |
| Wheat | 35 | 36 | 36 | 35 |
| Wild Oats | (¹) | 8 | 11 | 42 |
| Barley | 35 | 48 | 47 | 43 |
| Peas | 23 | 26 | 20 | 25 |

¹ Dead plants.

The results clearly show that 4-chloro-2-butynyl N-(3-chlorophenyl)carbamate effectively controlled the growth of wild oats in peas, barley and wheat at rates as low as 1 pound per acre, yet was non-injurious to the peas and wheat at 10 pounds per acre. Only slight injury to the barley occurred at 10 pounds per acre but no injury occurred at the 3-pound per acre rate. At 10 pounds per acre, the wild oats were severely stunted and eventually died. In close-seeded crops such as wheat, barley, flax and peas, wild oats treated with the active chemicals of this invention are "crowded out" by the less affected plants. Eleven weeks after treatment, the barley was in head and the peas were in bloom at all rates. The wheat was a winter variety and therefore was not in head. There was no evidence of chemical injury to the crops.

Similar experiments with 4-bromo-2-butynyl N-(3-chlorophenyl) carbamate and 4-chloro-2-butynyl N-(3-bromophenyl)carbamate have shown that these compounds are comparable or more active as selective herbicides for oats than 4-chloro-2-butynyl N-(3-chlorophenyl) carbamate.

To evaluate the pre-emergence herbicidal effects of 4-chloro-2-butynyl N-(3-chlorophenyl)carbamate, it was applied to a flat at a 50-pound per acre rate as a surface application immediately after planting oats, wheat, peas, radish, alfalfa, millet, brome and sugar beets. The growth of oats was stopped shortly after emergence and the other crops were not affected.

The carbamates of this invention are thus demonstrated to be highly effective as selective herbicides, and particularly, for controlling wild oats in other field crops. Thus, as little as about 0.1 pound of one or more of the carbamates applied uniformly to an acre of growing plants is effective although applications up to about 20 pounds per acre are sometimes desirable. The recommended application rates, however, are from about 0.5 to about 5 pounds of the active carbamate per acre. The compositions are also effective as a selective pre-emergence herbicide for oats when applied to the soil immediately after planting.

The high activity of the carbamates in controlling wild oats only requires the application of very small amounts of the active ingredient distributed uniformly over a wide area. Of course, this is difficult to do employing the pure material. However, by increasing the bulk of the material, such as by mixing the carbamate with an inert diluent or carrier, the application to growing plants can be achieved more readily.

There are thus also provided by this invention novel selective herbicidal compositions containing one or more of the described active carbamates intimately dispersed in an inert carrier or diluent for the intended use. Such carriers may be either solids such as talc, clay, diatomaceous earth, sawdust, calcium carbonate, and the like or liquids such as water, kerosene, acetone, benzene, toluene, and the like in which the active agent may be either dissolved or dispersed. Emulsifying agents may be used to achieve a suitable emulsion if two immiscible liquids are used as the carrier. Wetting agents may also be used to aid in dispersing the active carbamate in liquids used as a carrier in which the carbamate is not completely soluble.

A suitable emulsifiable concentrate which may be prepared and sold commercially for subsequent dilution with water to a suitable concentration of active carbamate can have the following composition:

24.5% 4-chloro-2-butynyl N-(3-chlorophenyl)carbamate.
8.5% ethylene dichloride.
2.0% methyl isobutyl ketone.
60.0% Espesol 6 (a highly refined petroleum base substitute for toluol).
5.0% Atlox 2081 (an alkyl aryl sulfonate blended with polyoxyethylene sorbitan esters of mixed fatty and resin acids).

Wettable powder concentrates are prepared by mixing the active carbamate with an inert solid diluent such as Fuller's earth, bentonite, hydrated aluminum magnesium silicate and a wetting agent. One representative wettable powder has the composition:

50% (weight) 4-chloro-2-butynyl N-(-chlorophenyl)-carbamate.
45% hydrated aluminum magnesium silicate.
3% Marasperse N (highly purified sodium lignosulfonate).
2% Triton X–120 (an alkyl aryl polyether alcohol).

A wettable powder such as this when mixed with water and a penetrating agent, such as lanolin or a kerosene emulsion as previously described, forms a dispersion which is particularly suitable for spray application. Enough water is generally used to provide sufficient carbamate in a final volume of about 1 to 10 gallons per acre.

Other additives such as a lanolin or kerosene emulsion, or Tween 20 (a product described as a sorbitan monolaurate polyoxyalkalene derivative), stickers, and other auxiliary materials may be included in solid or liquid formulations to increase coverage of the active carbamate.

The following examples are presented to illustrate the methods of preparing the compounds.

Example 1

4-CHLORO-2-BUTYNYL N-(3-CHLOROPHENYL) CARBAMATE

A benzene solution (100 ml.) of 10.4 grams (0.1 mole) of 4-chloro-2-butynol-1, 15.3 grams (0.1 mole) of 3-chlorophenylisocyanate and 3 drops of pyridine was refluxed for 3 hours. The cooled solution was then diluted with approximately twice its volume of petroleum ether and the crystalline product removed by filtration. Recrystallization of the crude product from a mixture of n-hexane and benzene gave 16.5 grams (64%) of product which melted at 71–73° C. Further recrystallizations raised the melting point to 75–76° C.

*Analysis.*—Calcd. for $C_{11}H_9O_2Cl_2N$: C, 51.2; H, 3.5. Found: C, 50.7; H, 3.2.

Example 2

4-BROMO-2-BUTYNYL N-(3-CHLOROPHENYL) CARBAMATE 4-bromo-2-butynyl N-(3-chlorophenyl)carbamate was prepared by the reaction of 3-chlorophenyl isocyanate with 4-bromo-2-butynol-1 as described in Example 1. The crystalline product melted at 76–78° C. and analyzed as follows:

*Analysis.*—Calcd. for $C_{11}H_9O_2BrClN$: C, 43.7; H, 3.0. Found: C, 43.33; H, 3.1.

Example 3

4-CHLORO-2-BUTYNYL N-(3-BROMOPHENYL) CARBAMATE

To a stirred solution of 68.8 grams (0.4 mole) of 3-bromoaniline in 300 ml. of chloroform was slowly added 33.4 grams (0.2 mole) of 4-chloro-2-butynyl chloroformate at 10–15° C. and the stirring continued for an hour. The crystalline 3-bromoaniline hydrochloride was removed by filtration and the chloroform filtrate diluted with approximately one liter of hexane. After standing approximately 30 minutes, the crystalline product which had precipitated was removed by filtration to give 52 grams (86%) of product. Recrystallization from a benzene-n-hexane mixture gave soft fibrous crystals which melted at 78–78.5° C. and analyzed as follows:

*Analysis.*—Calcd. for $C_{11}H_9O_2BrClN$: C, 43.7; H, 3.0. Found: C, 44.1; H, 3.28.

Various changes and modifications of the invention can be made and, to the extent that such variations incorporate the spirit of this invention, they are intended to be included within the scope of the appended claims.

What is claimed is:
1. 4-halo-2-butynyl N-(3-halophenyl)carbamates.
2. 4-chloro-2-butynyl N-(3-chlorophenyl)carbamate.
3. 4-bromo-2-butynyl N-(3-chlorophenyl)carbamate.
4. 4-bromo-2-butynyl N-(3-bromophenyl)carbamate.
5. 4-chloro-2-butynyl N-(3-bromophenyl)carbamate.
6. A composition for controlling oats comprising a 4-halo-2-butynyl N-(3-halophenyl)carbamate and an inert diluent.
7. A composition for controlling oats comprising 4-chloro-2-butynyl N-(3-chlorophenyl)carbamate and an inert diluent.
8. The method of retarding the growth of Avena oats comprising applying a 4-halo-2-butynyl N-(3-halophenyl)carbamate to soil and plants in an amount sufficient to retard the growth of oats.
9. The method of retarding the growth of Avena oats comprising applying 4-chloro-2-butynyl N-(3-chlorophenyl)carbamate to soil and plants in an amount sufficient to retard the growth of oats.
10. The method of retarding the growth of oats which comprises applying a 4-halo-2-butynyl N-(3-halophenyl)carbamate to soil and plants at a rate of from 0.1 to 50 pounds per acre.
11. The method of retarding the growth of oats which comprises applying a 4-halo-2-butynyl N-(3-halophenyl)carbamate to soil and plants at a rate of from 0.1 to 10 pounds per acre.
12. The method of retarding the growth of wild oats which comprises applying a 4-halo-2-butynyl N-(3-halophenyl)carbamate to soil and plants in an amount sufficient to retard the growth of wild oats.
13. The method of claim 12 in which 0.1 to 10 pounds of the carbamate is applied per acre.
14. The method of selectively retarding the growth of wild oats in the presence of other plants which comprises applying a 4-halo-2-butynyl N-(3-halophenyl)-carbamate to soil and plants in an amount sufficient to retard the growth of wild oats.
15. The method of selectively retarding the growth of wild oats in the presence of wheat which comprises applying a 4-halo-2-butynyl N-(3-halophenyl)carbamate to soil and plants in an amount sufficient to retard the growth of wild oats.
16. The method of retarding the growth of Avena oats which comprises applying 4-bromo-2-butynyl N-(3-chlorophenyl)carbamate to soil and plants in an amount sufficient to retard the growth of the oats.
17. The method of retarding the growth of wild oats which comprises applying 0.1 to 10 pounds per acre of 4-chloro-2-butynyl N-(3-chlorophenyl)carbamate to soil and plants.
18. The method of retarding the growth of wild oats which comprises applying 0.1 to 10 pounds per acre of 4-bromo-2-butynyl N-(3-chlorophenyl)carbamate to soil and plants.

References Cited in the file of this patent
UNITED STATES PATENTS
2,788,268    Tursich ---------------- Apr. 9, 1957

UNITED STATES PATENT OFFICE
CERTIFICATE OF CORRECTION

Patent No. 2,906,614

September 29, 1959

Thomas R. Hopkins et al.

It is hereby certified that error appears in the printed specification of the above numbered patent requiring correction and that the said Letters Patent should read as corrected below.

Column 2, line 42, for "effect" read -- affect --; column 4, line 49, for "N-(-chlorophenyl)" read -- N-(3-chlorophenyl) --.

Signed and sealed this 24th day of May 1960.

(SEAL)
Attest:

KARL H. AXLINE
Attesting Officer

ROBERT C. WATSON
Commissioner of Patents